United States Patent [19]
Fuster

[11] Patent Number: 5,622,759
[45] Date of Patent: Apr. 22, 1997

[54] SKATEBOARD GRIP TAPE

[76] Inventor: Marco A. Fuster, 5907 Ipswich Rd., Bethesda, Md. 20814

[21] Appl. No.: 494,071

[22] Filed: Jun. 23, 1995

[51] Int. Cl.⁶ ................................................. B62M 1/00
[52] U.S. Cl. ................. 428/40.2; 280/87.01; 280/87.02; 280/87.041; 280/87.042; 280/87.043; 428/40.1; 428/323; 428/325; 428/328; 428/331; 428/908.8
[58] Field of Search ............................. 428/40, 323, 325, 428/328, 331, 908.8, 40.1, 40.2; 280/87.041, 87.042, 87.043, 87.01, 87.021

[56] References Cited

U.S. PATENT DOCUMENTS

| | | | |
|---|---|---|---|
| 2,449,336 | 9/1948 | Spitzwieser | 280/16 |
| 3,309,104 | 3/1967 | Gold | 280/87.04 |
| 3,771,811 | 11/1973 | Bueno | 280/87.04 |
| 4,108,452 | 8/1978 | Baron | 280/87.04 |
| 4,145,065 | 3/1979 | Kupka | 280/87.04 |
| 4,328,274 | 5/1982 | Tarbutton | 428/149 |
| 4,337,963 | 7/1982 | Stevenson | 280/87.04 |
| 4,368,567 | 1/1983 | McMaster | 29/121.1 |
| 4,460,187 | 7/1984 | Shimizu | 280/87.04 |
| 4,824,139 | 4/1989 | Robbins | 280/87.042 |
| 4,911,734 | 3/1990 | Short | 8/471 |
| 5,055,340 | 10/1991 | Matsumura et al. | 428/172 |
| 5,340,433 | 8/1994 | Crump | 156/578 |

*Primary Examiner*—Nasser Ahmad
*Attorney, Agent, or Firm*—Myers Liniak & Berenato

[57] ABSTRACT

Grip tape adapted to be adhered to a surface such as a skateboard. The grip tape includes a screen structure covered with an abrasive material such as silicon carbide. A grid or array of apertures defined by the screen structure are defined in the grip tape so as to improve water run-off from the grip tape, simplify removal of the tape from the surface, create a see-through grip tape, and speedup moisture evaporation. Additionally, the screen-like grid system of the flexible grip tape provides additional surface area which can be gripped by the user thereby improving the tapes gripping characteristics.

16 Claims, 2 Drawing Sheets

SKATEBOARD GRIP TAPE

This invention relates to grip tape to be adhered to a surface for improving its gripping characteristics. More particularly, this invention relates to grip tape to be used on a surface such as a skateboard, the grip tape including a screen structure covered with or coated by an abrasive material such as silicon carbide.

BACKGROUND OF THE INVENTION

Grip tape is old and well-known throughout the art. Grip tape typically includes a substantially flat continuous flexible sheet of material covered by or coated with an abrasive material. Such grip tapes are typically adhered to surfaces such as skateboards, scooters, boats, stairs, decks, mopeds, or the like for the purpose of improving the user's ability to grip them.

Unfortunately, such grip tapes are difficult to remove intact and often experience problems when exposed to moisture such as rain or the like. What often happens is that in wet conditions, such grip tapes become slippery. Thus, the user's ability to grip the surface (e.g. skateboard) is actually inhibited instead of improved when such grip tapes become wet. With respect to removal of such grip tapes, such tapes are difficult to work with and sometimes nearly impossible to remove from the adhered to surface intact (i.e. in one piece). Accordingly, it is clear that there exists a need in the art for a grip tape which is improved with respect to performance in wet conditions and being able to be removed easily and intact.

The use of grip tape or the like on skateboards or other wheeled vehicles such as scooters is old and well-known throughout the art. See, for example, U.S. Pat. Nos. 4,145,065; 4,460,187; and 3,309,104, just to name a few. The grip tape of the aforesaid '187 patent is termed a "non-skid agent" which appears as a continuous sheet on the upper surface of a roller ski. The grip tape of the '065 patent is termed a "non-skid" portion preferably comprising a non-skid sand paint. The '065 patent also discloses that under some circumstances it may be desirable to use paste-on non-skid strips rather than non-skid paint. Further, the '104 patent discloses its grip tape as including a foot engaging pad formed with an upper anti-slip surface of any design configuration to be disposed on the roller scooter.

The substantially continuous grip tapes of the above-referenced patents are non-see-through and all suffer from the same problems as the aforesaid grip tape in that removal is difficult and their performance in wet conditions is less than desirable.

In view of the above, it is apparent that there exists a need in the art for a grip tape for placement on a surface such as a skateboard which is easily removable intact and results in improved gripping characteristics both in dry and wet conditions. It would also be desirous if such a grip tape is see-through so that instructions, advertisements, and the like located below the grip tape on the adhered to surface are visible.

It is a purpose of this invention to fulfill the above-described needs, as well as other needs apparent to the skilled artisan from the following detailed description of this invention.

SUMMARY OF THE INVENTION

Generally speaking, this invention fulfills the above-described needs in the art by providing a skateboard comprising:

a substantially flat elongated platform, a top surface of which is adapted to support a rider;

wheels mounted at each end of the elongated platform; and see-through screen grip tape adhered to the top surface of the skateboard, the screen grip tape including a screen structure coated with an abrasive material, and an array of apertures defined therein between crisscrossing elements of the screen structure whereby the grip tape is substantially see-through and the rider is provided with improved gripping characteristics.

According to certain preferred embodiments of this invention, the abrasive material is silicon carbide.

This invention further fulfills the above-described needs in the art by providing a see-through grip tape adapted to be adhered to a surface for the purpose of improving a user's grip on the surface, the grip tape comprising:

a flexible screen structure adapted to be adhered to the surface, the screen structure defining a plurality of apertures so that the grip tape is see-through; and an abrasive material covering the screen structure for improving the user's grip on the surface.

In certain preferred embodiments of this invention, the pitch of the screen structure is from about 1/32 inch to 1/8 inch.

This invention will now be described with reference to certain embodiments thereof as illustrated in the following drawings.

DETAILED DESCRIPTION OF CERTAIN EMBODIMENTS OF THIS INVENTION

Figure 2:
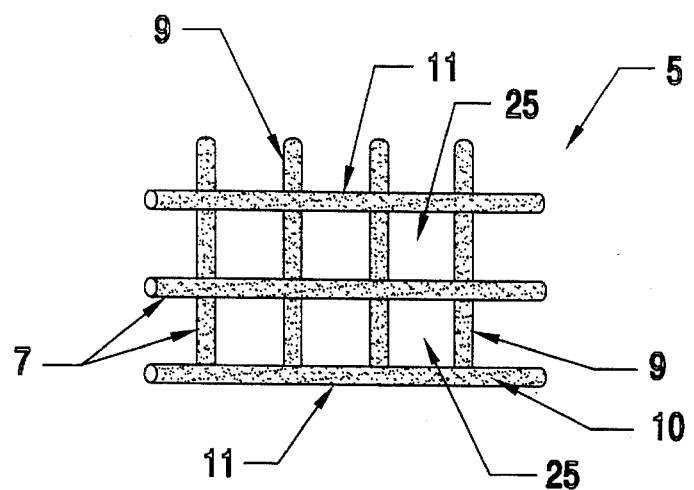
FIG. 2 is a top plan view of the grip tape according to the above-described embodiment of this invention.

Referring now more particularly to the accompanying drawings in which like reference numerals indicate like parts throughout the several views.

Figure 1:
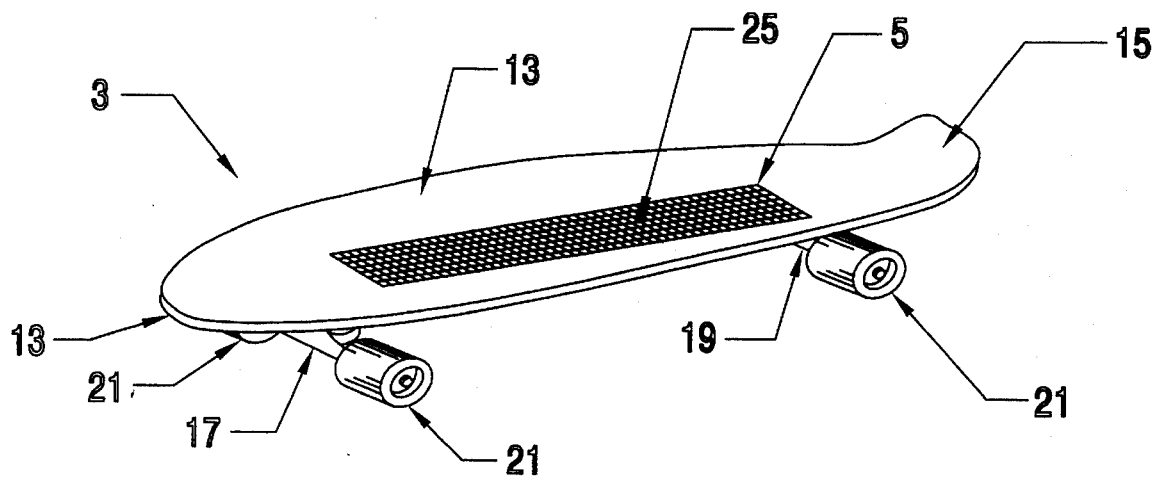
FIG. 1 is a perspective view of a skateboard having the grip tape according to an embodiment of this invention disposed thereon.

FIG. 1 is a perspective view of skateboard 3 having grip tape 5 adhered thereto according to a first embodiment of this invention. Grip tape 5 is screen-like in design and includes a base screen structure 7 made up of crisscrossing elongated members 9 and 11 (see FIG. 2 and 3). Elongated members 9 included in screen structure 7 are arranged vertically or in the column direction while elongated members 11 making up screen structure 7 are arranged in the horizontal or row direction so that members 9 and 11 crisscross one another forming substantial right angles with one another at intersections thereof.

As shown in FIG. 1 (and FIG. 5), skateboard 3 includes substantially flat platform 13 which has a raised tail portion (kick-tail) 15 defined at one end thereof. Platform 13 of skateboard 3 has trucks 17 and 19 affixed thereto at opposite ends of the platform 13. Trucks 17 and 19 are preferably attached to platform 13 by way of screws 18. Platform 13 is of any conventional type and may be of, for example, wood, plastic, or the like. Likewise, trucks 17 and 19 support wheels 21 and may be of any conventional type.

Column and row elongated members 9 and 11 respectively of grip tape 5 define apertures 25 therebetween. Thus, when grip tape 5 is adhered to the upper surface of skateboard platform 13 by way of either pressure sensitive adhesive 50 or an industrial spray adhesive (both conventional in nature), apertures 25 are defined adjacent the upper surface of platform 13 between elongated screen members 9 and 11. Each aperture 25 is closed off at its lower side by the upper surface of skateboard platform 13 and is exposed to the atmosphere at its upper surface. Apertures 25 allow the grip tape to be substantially see-through (see FIG. 5).

The presence of apertures 25 within grip tape 5 also allows water to run off more easily from the upper surfaces of the grip tape elongated members (i.e. so the water collects in the apertures 25 or runs off of the skateboard) and also permits grip tape 5 to be removed from platform 13 intact and in a more simplified and easy manner. Screen structure 7 reinforces the grip tape and permits the screen structure 7 including the abrasive material 10 to be removed substantially intact. Thus, when a user decides to remove grip tape 5 from platform 13, it is easily peeled off intact so that no residue (other than irrelevant adhesive particles in some circumstances) is left over. Apertures 25 also allow the grip tape to be see-through so as to permit advertisements and the like on the surface of platform 13 to be seen or viewed through the grip tape.

Additionally, the crisscrossing grid (9 and 11) of screen structure 7 provides a variety of surface area sections for the rider's feet to contact when the rider is on the upper surface of platform 13 riding the skateboard, for example. Because grip tape 5 is flexible, when the rider is standing on top of grip tape 5 on platform 13, the rider's feet (i.e. the bottom of the rider's shoes) contact not only the upper surface of the grip tape but also side and edge surfaces of elongated members 9 and 11 therefore increasing the surface area of members 9 and 11 contacted by the rider's feet thus improving gripping characteristics. Also, because the rider's feet engage side and edge areas of members 9 and 11 of grip tape 5, improved gripping is provided during turns of skateboard 3 by the user.

Screen structure 7 is coated with or covered by an abrasive material 10 as shown in FIG. 2 by the dots illustrated in members 9 and 11. Abrasive material 10 is also illustrated in the side cross-sectional view of FIG. 4. This abrasive material or coating 10 includes silicon carbide according to certain embodiments of this invention. According to alternative embodiments of this invention, this abrasive material 10 consists essentially of silicon carbide. Alternatively, any other known abrasive materials 10 suitable for such uses may be used as will be appreciated by those of skill in the art.

The pitch, or distance between adjacent parallel members 9 (or parallel members 11) is from about 1/32 to 1/8 inches according to certain embodiments of this invention. Meanwhile, grip tape 5 has an abrasive material grit (or grade) of from about 100 to 200, preferably about 120 according to certain embodiments of this invention. The color of grip tape 5 may be black, clear, brown, red, substantially transparent or any other suitable color.

Grip tape 5 may include, for example, 3M™ drywall sanding screen, medium, Cat. No. 9090 or 9094 according to certain embodiments of this invention, this screen sanding sheet including a base screen structure and having silicon carbide abrasive material 10 disposed on all sides of the screen structure (i.e. front, back, rear, left, right, etc.). Similar screen sanding products may also be obtained from Norton and Carborundum Abrasives.

Figure 4:
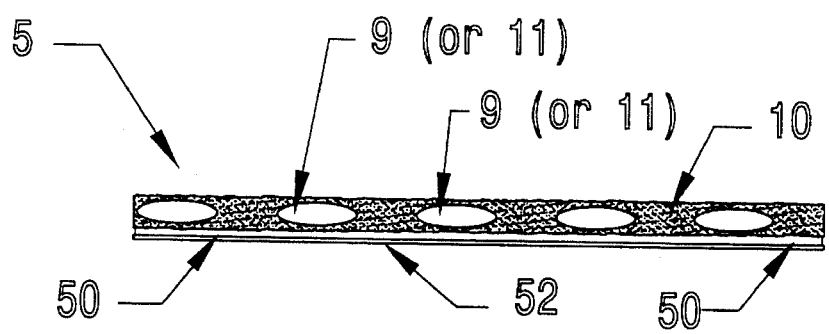
FIG. 4 is a side elevational cross-sectional view of the grip tape of FIGS. 1-3 illustrating the screen grid, abrasive material, pressure sensitive adhesive, and removable wax paper backing.

Alternatively, according to preferred embodiments of this invention, screen structure 7 includes the abrasive material (e.g. silicon carbide) 10 disposed on only its upper surface which is adapted to be contacted by the rider's feet as shown in FIG. 4. Thus, in such embodiments, the lower surface of screen 7 does not have the abrasive material disposed thereon and is therefore more easily and efficiently adhered to the upper surface of platform 13 by way of pressure sensitive adhesive (PSA) layer 50. As shown in FIG. 4, PSA layer 50 is sandwiched between screen structure 7 (9 and 11) and removable backing layer 52. Removable backing layer 52 may be wax paper or any other suitable removable backing material.

FIG. 4 is a side cross-sectional view illustrating grip tape 5 before it is attached to a surface such as a skateboard, scooter, stair, boat, deck, or the like. Grip tape 5, as shown in FIG. 4, includes the base screen structure 7 (including elements 9 and 11) which is covered on at least one side by abrasive material 10. On the side of screen structure 7 not covered by abrasive material 10, the screen structure 7 (9 and 11) is covered with pressure sensitive adhesive layer 50 and removable backing layer 52. Thus, when a user wishes to apply grip tape 5 to a surface, the user simply needs to remove backing 52 and apply grip tape 5 to the surface so that pressure sensitive adhesive layer 50 adheres the grip tape (including screen structure 7 and abrasive material 10) to the surface.

Figure 5:
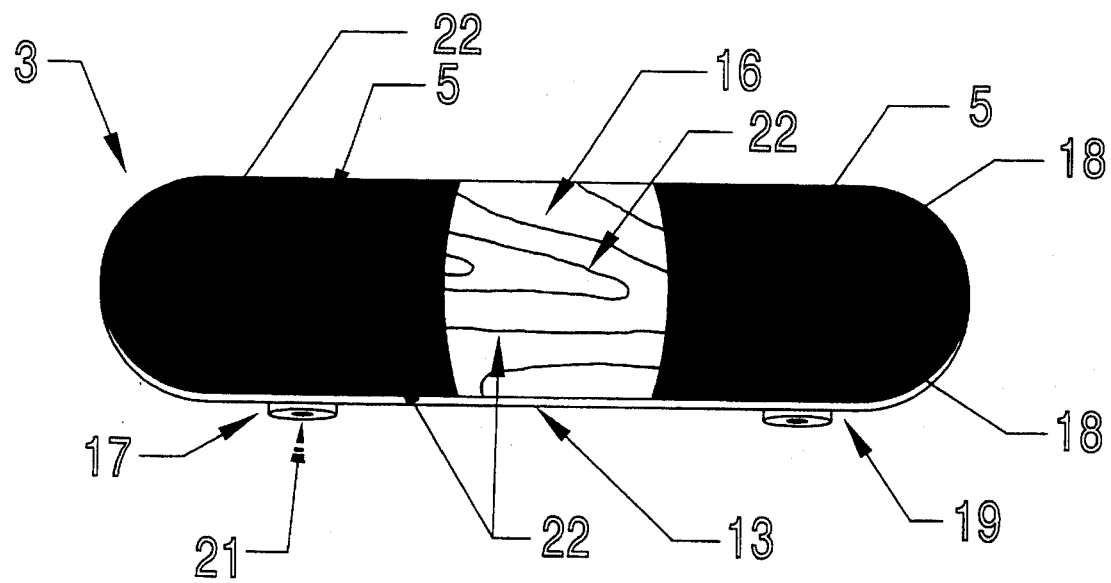
FIG. 5 is a top plan view of a skateboard having grip tape disposed thereon according to another embodiment of this invention.

FIG. 5 is a top plan view of substantially see-through grip tape 5 applied on the upper surface of skateboard 3 according to another embodiment of this invention. This embodiment differs from that of FIG. 1 only in that the grip tape is applied to different areas of the board's upper surface. Grip tape 5 is adhered to the upper surface of platform 13 in FIG. 5 in two separate areas so as to leave gap 16 therebetween.

The substantially see-through or transparent nature of grip tape 5 is also shown in FIG. 5. As illustrated, grip tape 5 is substantially see-through (transparent) as a result of apertures 25 so that screws 18 and wood grain lines 22 are visible in both the areas covered by grip tape 5 and the areas not covered by grip tape 5. Platform 13 in FIG. 5 is, of course, made of wood including grain lines 22.

A significant advantage associated with the substantially see-through nature of grip tape 5 is that it may be placed on a surface without covering up instructional writing, grain lines, advertisements, or the like defined on the surface covered. This is, of course, a significant improvement over prior art grip tapes.

As illustrated in FIGS. 4 and 5, pressure sensitive adhesive 50 may be substantially transparent according to certain embodiments of this invention, and alternatively may be non-transparent according to other embodiments. When grip tape 5 is to be applied to a surface so that underlying markings (instructional writing, grain lines, advertisements, etc.) can be viewed through it, it is desirable that pressure sensitive adhesive layer 50 is substantially transparent. Any conventional pressure sensitive adhesive (e.g. substantially transparent) may be used. Alternatively, conventional spray adhesives such as 3M Super 77 may be used.

Figure 3:
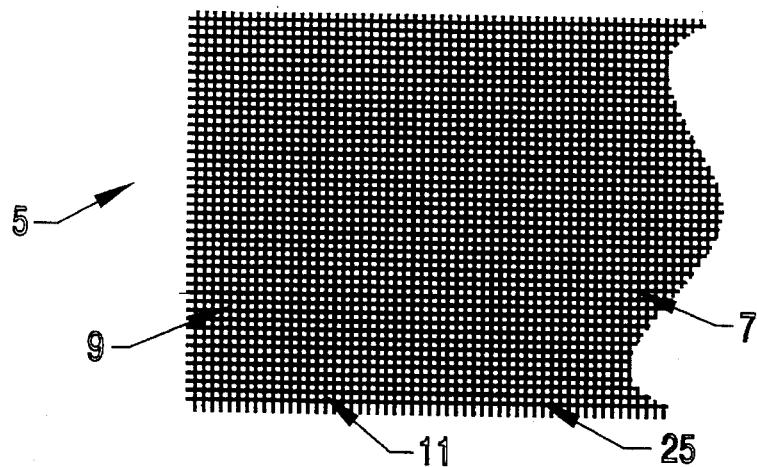
FIG. 3 is a top plan view of the screen grip tape of FIGS. 1 and 2 in approximate actual size according to certain embodiments of this invention.

FIGS. 2 and 3 illustrate screen structure 7 of grip tape 5 designed so that criss-cross members 9 and 11 are substantially linear in nature. According to certain alternative embodiments of this invention, screen members 9 and 11 may be wave-like in design (not shown) so as to define, for example, a sinusoidal curve-like structure. Other possible grid patterns include zig-zag patterns, tire-tread patterns, spider-web type patterns, etc. In such embodiments, all members 11 are, of course, substantially parallel to one another as are members 9.

Once given the above disclosure, many other features, modifications, and improvements will become apparent to the skilled artisan. Such other features, modifications, and improvements are therefore considered to be a part of this invention, the scope of which is to be determined by the following claims.

I claim:

1. A skateboard comprising:

a substantially flat elongated platform, a top surface of which is adapted to support a rider;

wheels mounted at each end of said elongated platform; and see-through screen grip tape adhered to said top surface of said skateboard via an adhesive on only a single face of the tape, said screen grip tape including a screen structure coated on only its upper side with an abrasive material, and an array of apertures defined therein between crisscrossing elements of said screen structure such that the grip tape is substantially see-through and the rider is provided with gripping characteristics.

2. The skateboard of claim 1, wherein said abrasive material is provided on only the upper surface of said screen structure tape so that the bottom surface of said screen structure is adhered directly to said top surface of said platform via said adhesive.

3. The skateboard of claim 1, wherein said abrasive material is silicon carbide.

4. The skateboard of claim 1, wherein pitch of the screen structure is from about $1/32$ to $1/8$ inches thereby providing water run-off characteristics of the grip tape and its removal from the platform.

5. The skateboard of claim 1, wherein said grip tape is adhered to said platform by way of one of a substantially transparent pressure sensitive adhesive and a substantially transparent spray adhesive.

6. The skateboard of claim 1, wherein the grip tape is from about 100 to 200 grit.

7. The skateboard of claim 6, wherein the grip tape is about 120 grit.

8. A system including see-through grip tape adhered to a surface for providing a user's grip on the surface, the system comprising:

a flat skateboard surface;

a flexible screen structure adhered to the flat surface, said screen structure defining a plurality of apertures so that the grip tape is substantially see-through; and an abrasive material covering said screen structure for providing the user's grip on the surface.

9. The grip tape of claim 8, wherein said abrasive material is silicon carbide.

10. The grip tape of claim 8, wherein only one surface, the gripping surface, of said screen structure is covered by said abrasive material.

11. The grip tape of claim 8, wherein pitch of the screen structure is from about $1/32$ inch to $1/8$ inch.

12. The grip tape of claim 8, wherein the grit of the tape is about 120.

13. The grip tape of claim 10, further comprising a pressure sensitive adhesive layer and a removable backing layer provided on the screen structure on the side of the screen structure opposite the abrasive material.

14. The grip tape of claim 8, further comprising a pressure sensitive adhesive layer and a removable backing layer on the screen structure on the side of the screen structure opposite the abrasive material.

15. The skateboard of claim 1, further comprising a substantially transparent pressure sensitive adhesive layer disposed between the platform and the grip tape.

16. The tape of claim 8, wherein the flexible screen structure is in the pattern of one of a right-angled grid, a spider-web pattern, a wave pattern, and a zig-zag pattern.

\* \* \* \* \*